US010325295B1

(12) United States Patent
Augenstein et al.

(10) Patent No.: US 10,325,295 B1
(45) Date of Patent: Jun. 18, 2019

(54) PRICING OF IMAGERY AND COLLECTION PRIORITY WEIGHTING

(71) Applicant: Planet Labs, Inc., San Francisco, CA (US)

(72) Inventors: Sean Augenstein, Palo Alto, CA (US); Daniel Berkenstock, Palo Alto, CA (US); Julian M. Mann, Menlo Park, CA (US)

(73) Assignee: Planet Labs, Inc., San Francisco, CA (US)

( * ) Notice: Subject to any disclaimer, the term of this patent is extended or adjusted under 35 U.S.C. 154(b) by 615 days.

(21) Appl. No.: 14/585,866

(22) Filed: Dec. 30, 2014

Related U.S. Application Data

(60) Provisional application No. 61/921,809, filed on Dec. 30, 2013.

(51) Int. Cl.
*G06Q 30/02* (2012.01)

(52) U.S. Cl.
CPC .................. *G06Q 30/0283* (2013.01)

(58) Field of Classification Search
None
See application file for complete search history.

(56) References Cited

U.S. PATENT DOCUMENTS

| 5,911,389 | A | 6/1999 | Drake |
| 5,978,653 | A | 11/1999 | Taylor et al. |
| 5,987,363 | A | 11/1999 | Quan et al. |
| 6,241,192 | B1 | 6/2001 | Kondo |
| 6,491,257 | B1 | 12/2002 | Emmons, Jr. et al. |
| 6,502,790 | B1 | 1/2003 | Murphy |
| 6,512,920 | B1 | 1/2003 | Yaoya |
| 6,606,529 | B1 | 8/2003 | Crowder et al. |
| 6,738,346 | B1 | 5/2004 | Prieto et al. |
| 7,002,918 | B1 | 2/2006 | Prieto, Jr. et al. |
| 7,542,829 | B2 | 6/2009 | Lee et al. |
| 8,913,528 | B2 | 12/2014 | Cheng et al. |
| 8,997,619 | B2 | 4/2015 | Sasaki et al. |

(Continued)

FOREIGN PATENT DOCUMENTS

| CN | 102322850 | 1/2012 |
| CN | 102354288 | 2/2012 |

(Continued)

OTHER PUBLICATIONS

Capderou, "Orbit and Ground Track of a Satellite", Chapter 5 from Satellites: Orbits and Missions, Springer, 2005, pp. 175-263.

(Continued)

*Primary Examiner* — Kurtis Gills
*Assistant Examiner* — Akosua Kyereme-Tuah
(74) *Attorney, Agent, or Firm* — Dority & Manning, P.A.

(57) ABSTRACT

Systems and methods are provided for selecting, pricing, and prioritizing images obtained by a constellation of imaging satellites. The systems and methods presented can determine whether an imagery collection request should be accepted or rejected. If the imagery collection request is accepted, the systems and methods presented can determine an appropriate pricing option for the imagery collection request and how the imagery collection request should be prioritized in relation to other outstanding imagery collection requests.

19 Claims, 11 Drawing Sheets

(56) References Cited

U.S. PATENT DOCUMENTS

| | | | |
|---|---|---|---|
| 9,126,700 | B2 | 9/2015 | Ozkul et al. |
| 9,132,925 | B2 | 9/2015 | Korb |
| 2003/0052777 | A1* | 3/2003 | Bleier ............... G01V 1/008 340/540 |
| 2003/0095181 | A1 | 5/2003 | LeCompte |
| 2004/0158832 | A1 | 8/2004 | Chechik et al. |
| 2008/0255908 | A1 | 10/2008 | Smith et al. |
| 2009/0171700 | A1 | 7/2009 | O'Sullivan et al. |
| 2010/0119053 | A1 | 5/2010 | Goeldi |
| 2010/0309313 | A1 | 12/2010 | Antikidis |
| 2010/0311417 | A1 | 12/2010 | Korb et al. |
| 2011/0115793 | A1 | 5/2011 | Grycewicz |
| 2011/0188548 | A1 | 8/2011 | Antikidis |
| 2011/0268158 | A1 | 11/2011 | Miller et al. |
| 2012/0029812 | A1 | 2/2012 | Abdulaziz et al. |
| 2012/0036085 | A1 | 2/2012 | Srivastava et al. |
| 2012/0155329 | A1 | 6/2012 | Shaffer et al. |
| 2012/0188372 | A1* | 7/2012 | Ozkul ............... B64G 1/1021 348/144 |
| 2012/0254887 | A1 | 10/2012 | Rodriguez |
| 2013/0010597 | A1* | 1/2013 | Liu ............... H04W 28/16 370/235 |
| 2013/0086072 | A1 | 4/2013 | Peng et al. |
| 2013/0121079 | A1 | 5/2013 | Oliver et al. |
| 2013/0275036 | A1 | 10/2013 | Olivier et al. |
| 2014/0027576 | A1 | 1/2014 | Boshuizen et al. |
| 2014/0039963 | A1 | 2/2014 | Augenstein et al. |
| 2014/0040282 | A1 | 2/2014 | Mann et al. |
| 2014/0099884 | A1* | 4/2014 | Lozano ............... H04M 15/81 455/12.1 |

FOREIGN PATENT DOCUMENTS

| | | |
|---|---|---|
| CN | 102867107 | 2/2012 |
| CN | 103336715 | 10/2013 |
| EP | 0 992 429 | 4/2000 |
| EP | 2 664 989 | 11/2013 |
| WO | WO 97/26187 | 7/1997 |
| WO | WO 2004/048197 | 6/2004 |
| WO | WO 2011/089477 | 7/2011 |
| WO | WO 2014/022810 | 2/2014 |

OTHER PUBLICATIONS

Carrel et al., "An Evolutionary Algorithm for Near-Optimal Autonomous Resource Management", Procedures of the 8th International Symposium on Artificial Intelligence, Robotics and Automation in Space, Munich, Germany, Sep. 5-8, 2005, 8 pages.
Christophe et al., "Remote Sensing Processing.: From Multicore to GPU", IEEE Journal on Selected Topics in Applied Earth Observations and Remote Sensing, vol. 4, No. 3, Sep. 2011, p. 643-652.
Hwang et al., "Development of a Multi Remote Sensing Satellites Mission Planning System", 28th Asian Conference on Remote Sensing, Kuala Lumpur, Malaysia, Nov. 12-16, 2007, vol. 2 of 3, Paper TS 24.1, pp, 746-751.
Hwang et al., "Multi-Objective Optimization for Multi-Satellite Scheduling System", The 31st Asian Conference on Remote Sensing, Hanoi, Vietnam, Oct. 31.-Nov. 4, 2010 Paper TS 38.4, 6 pages.
Li et al., "An Analytical Model to Predict the Probability Density Function of Elevation Angles for LEO Satellite Systems", IEEE Communications Letters, vol. 6, No. 4, Apr. 2002, pp. 138-140.
Mai et al., "Conversation of North American Aerospace Defense Command Elements to Epicycle Elements", Journal of Guidance, Control, and Dynamics, vol. 24, No. 2, Mar.-Apr. 2001, pp. 406-408.
Wu et al., "ImPredict: A Fast Image Prediction Software and Its Application is the SSTL Off-Axis Image Scheduling System", 15th AIAA/USU Conference on Small Satellites, 2001, Paper SSC01-Villa-1, 10 pages.
PCT Search Report and Written Opinion in PCT/US2013/053492, dated May 21, 2014—18 pages.

Invitation to Pay Additional Fees in PCT/US2013/053492, dated Feb. 18, 2014—8 pages.
Bataille, "Efficiency and Fairness When Sharing the Use of a Satellite", Proceedings of Fifth International Symposium on Artificial Intelligence, Robotics and Automation in Space, Noordwijk, the Netherlands, Jun. 1-3, 1999, pp. 465-470.
Beaumet et al., "Decision-Making On-Board an Autonomous Agile Earth-observing Satellite", The International Conference on Automated Planning and Scheduling, Sydney, Australia, Sep. 17, 2008—7 pages.
Bellman, "On a Routing Problem", Notes, vol. XIV, No. 1, 1956 pp. 87-90.
Bensana, "Testing Spacecraft Autonomy with AGATA", Proceedings of the 9th International Symposium on Artificial Intelligence, Robotics, and Automation for Space, Los Angeles, California, Feb. 25-29, 2008—9 pages.
Bogosian, "Image Collection Optimization of Lightweight, Low Areal-Density Space Telescopes", Master's Massachusetts Institute of Technology, May 23, 2008, 155 pages.
Bouveret et al., "New Constraint Programming Approaches for the Computation of Leximin-Optimal Solutions in Constraint Networks", Proceedings of the 20th International Joint Confernece on Artificial Intelligence, Hyderbad, India, Jan. 12, 2007, pp. 62-67.
Chevaleyre et al., "Issues in Multiagent Resource Allocation", Informatica, vol. 30, No. 1, 2006, p. 331.
Dijkstra, "A Note on Two Problems in Connexion with Graphs", Numerische Mathematik, vol. 1, Jun. 1959, pp. 269-271.
Directed Acyclic Graph, http://en.wikipedia.org/wiki/Directed_acyclic_graph, Retrieval Date Aug. 7, 2014—10 pages.
Endriss et al., "Proceedings of the 1st International Workshop on Computational Social Choice", University of Amsterdam, Dec. 2006, 519 pages.
Ford et al., "Flows in Networks", The Rand Corpoation, Aug. 1962—332 pages.
Gabrel et al., "A New Single Model and Derived Algorithms for the Satellite Shot Planning Problem Using Graph Theory Concepts", Annals of Operation Research, vol. 69, 1997, pp. 115-134.
Gabrel et al., "Enumeration and Interactive Selection of Efficient Paths in a Multiple Criteria Graph for Scheduling an Earth Observing Satellite", European Journal of Operational Research, vol. 139, Issue 3, 2002, pp. 533-542.
Gabrel et al., "Mathematical Programming for Earth Observation Satellite Mission Planning", Chapter 7, Operations Research in Space and Air, 2003, pp. 103-122.
Gabrel, "Strengthened 0-1 Linear Formulation for the Daily Satellite Mission Planning", Journal of Combinatorial Optiminzation, vol. 1 Issue 3, Jan. 11, 2006, pp. 341-346.
Harrison et al., "Task Scheduling for Satellite Based Imagery", In Proceedings of the 18th Workshop of the UK Planning and Scheduling Special Interest Group, vol. 78, University of Salford, UK, Dec. 15-16, 1999—15 pages.
Lemaitre et al., "How to Manage the New Generation of Agile Earth Observation Satellites?", International Conference on Space Operations, Toulouse, France, Jun. 2000—9 pages.
Lemaitre et al., "Selecting and Scheduling Observations of Agile Satellites", Aerospace Science and Technology. vol. 6, No. 5. Jul. 1, 2002, pp. 367-381.
Lemaitre et al., "Sharing the Use of Earth Observation Satellites", Proceedings of the 3rd NASA International Workshop on Planning and Scheduling for Space, Houston, Texas, Oct. 27-29, 2002—5 pages.
Lemaitre et al., "Towards the Formal Verification of the Functional Architecture of Autonomous Satellite Onboard Flight Software", 3rd National Conference on Control Architectures of Robots, Bourges, May 29-30, 2008, 8 pages.
Pralet et al., "Controller Synthesis for Autonomous Systems: A Constraint-Based Approach", 10th International Symposium on Artificial Intelligence, Robotics and Automation in Space, Saporo, Japan, Aug. 29-Sep. 1, 2010,—8 pages.
Verfaillie et al., "How to Model Planning and Scheduling Problems Using Constraint Networks on Timelines", The Knowledge Engineering Review, vol. 25, Special Issue 3, Sep. 2010, pp. 319-336.

(56) References Cited

OTHER PUBLICATIONS

Third Party Submission—Concise Description of Relevance, Mar. 18, 2015—11 pages.
Kim et al., "Generation of Cloud-free Imagery Using Landsat-8," published as paper SC02-0828 in The 34th Asian Conference on Remote Sensing, Proceedings, ACRS 2013, Oct. 20-24, 2013, Bali, Indonesia—7 pages.
Yeh et al., "Geometry Analysis Based Genetic Algorithm for Satellite Imaging Scheduling," The 32th Asian Conference on Remote Sensing (ACRS 2011), Oct. 3-7, 2011, Taipei, Chinese Taipei—6 pages.
Wikipedia article, "SIMD", old revision dated Dec. 3, 2013, retrived on Mar. 30, 2017, https://en.wikipedia.org/w/index.php?title=SIMD&oldid=584315722, 7 pages.
Wikipedia article, "Streaming SIMD extensions", old revision dated Dec. 27, 2013, retrieved on Mar. 30, 2017, https://en.wikipedia.org/w/index.php?title=Streaming_SIMD_Extensions&oldid=587972486, 5 pages.
Mai et al., "Fast algorithm for prediction of satellite imaging and communication opportunities," Journal of Guidance, Control, and Dynamics, AIAA, vol. 24 No. 6, Nov.-Dec. 2001, pp. 1118 to 1124.
Schilling, "Mission analyses for low-earth-observation missions with spacecraft formations," NATO/OTAN publication RTO-EN-SCI-209, Paper 1, Apr. 2009, downloaded from https://www.cso.nato.int/pubs/rdp.asp?RDP=RTO-EN-SCI-209—26 pages.
Steyn, "A view finder control system for an earth observation satellite," Aerospace Science and Technology, vol. 10, 2006, pp. 248 to 255.
Wu et al., "Fast prediction algorithms of satellite imaging opportunities with canted camera and attitude controls," AIAA Guidance, Navigation, and Control Conference and Exhibit, Aug. 6-9, 2001, Montreal, Canada, Paper AIAA-2001-4270 (A01-37137)—11 pages.
Forti, (Supervisor: De Angelis), "DAG Scheduling for Grid Computing Systems," Ph.D. Thesis, University of Udine—Italy, Department of Mathematics and Computer Science, 2006—123 pages.
Pemberton et al., "On the Need for Dynamic Scheduling of Imaging Satellites," Department of Computer Science, Drexel University, Philadelphia, PA, Pecora 15/Land Satellite Information IV/ISPRS Commission I/FIEOS 2002 Conference Proceedings. (Year: 2002)—7 pages.

* cited by examiner

PRICING OF IMAGERY AND COLLECTION PRIORITY WEIGHTING

PRIORITY CLAIM

The present application is based on and claims priority to U.S. Provisional Application 61/921,809 having a filing date of Dec. 30, 2013, which is incorporated by reference herein.

BACKGROUND

Pricing and prioritization problems appear in many applications such as satellite scheduling, airline reservations, hotel bookings, and the like. Applications such as these involve allocating resources (e.g., imaging time on a satellite, seats on a plane, rooms in a hotel, etc.) that are typically scarce and constrained in various ways (e.g., in the capacity of resources). Solving a typical pricing and prioritization problem can involve creating a mapping of resources that satisfy certain constraints and are optimal according to one or more criteria. Solutions to such problems can be challenging.

SUMMARY

The systems, methods and devices described herein have innovative aspects, no single one of which is indispensable or solely responsible for their desirable attributes. Without limiting the scope of the disclosure or claims, some of the advantageous features will now be summarized.

One goal in selecting, pricing, and prioritizing the collection of imagery can be to maximize revenue generation. A constellation of satellites represent a limited resource. It would be advantageous to exploit the limited resource such that the maximum number of imagery collections can take place.

Another goal is to improve customer satisfaction with imagery collection requests. Balancing a desire to maximize revenue generation with improving customer satisfaction may be difficult. However, customer satisfaction may be increased if imagery collection requests that cannot be handled are not accepted, accurate imagery collection completion estimates are provided, and/or deadlines are met.

Accordingly, provided herein are systems and methods for selecting, pricing, and/or prioritizing images obtained by a constellation of imaging satellites. The systems and methods presented can determine whether an imagery collection request should be accepted or rejected. If the imagery collection request is accepted, the systems and methods presented can determine an appropriate pricing option for the imagery collection request and how the imagery collection request should be prioritized in relation to other outstanding imagery collection requests.

Embodiments of the systems and methods described herein can be used for pricing, scheduling, and/or collection of imagery of desired locations on the Earth or other planets, satellites, asteroids, comets, etc. For example, the systems and methods can be used for a constellation of satellites around the Moon, Mars, or other planetary body.

Additionally, embodiments of the system and methods disclosed herein are applicable to types of combinatorial optimization problems other than scheduling problems for satellites, hotels, airlines, etc. For example, in various embodiments, the systems and methods can be applied to traveling salesman problems, spanning tree problems, shortest/longest path problems, routing problems, Boolean satisfiability problems, and so forth. Although certain goals and advantages are described, no single embodiment necessarily must include each and every such goal and advantage. Various implementations can be designed to achieve one, some, or all such goals and advantages and/or other goals or advantages.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Overview

Figure 1:
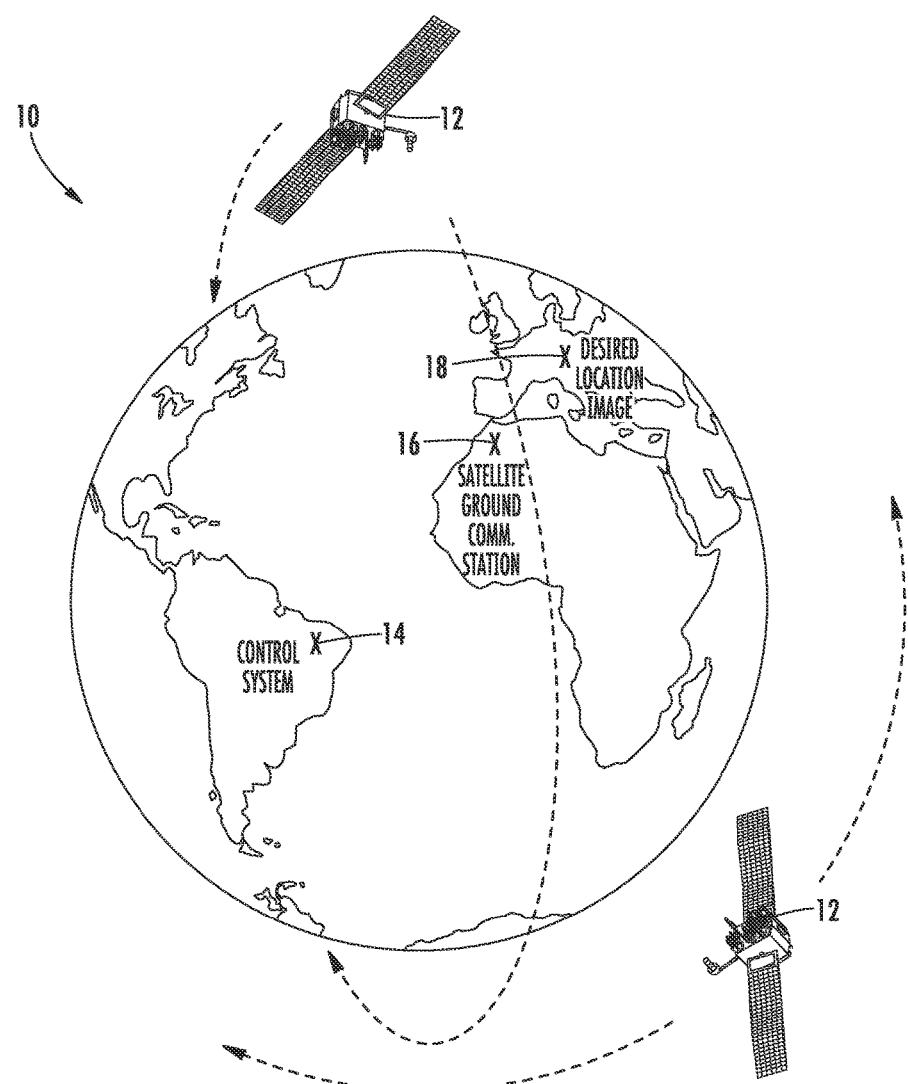
FIG. 1 illustrates a representation of an example constellation of imaging micro-satellites in a low-earth orbit, a control system, a ground communication system, and a desired imagery location.

Pricing and prioritization problems can involve one or more constraints. An example of a constraint may be increasing profitability. However, satisfying such a constraint may negatively impact customer satisfaction with the product or services offered. Thus, implementing a pricing and prioritization scheme that maximizes revenue while also improving customer satisfaction can be challenging.

In certain aspects, this disclosure is directed to systems and methods for selecting, pricing, and prioritizing images obtained by a constellation of imaging satellites, and more particularly for selecting, pricing, and prioritizing images in a manner that increases or maximizes generated revenue and improves customer satisfaction. In some implementations, the disclosed systems and methods can be used to determine whether an imagery collection request should be accepted or rejected. In some implementations, if the imagery collection request is accepted, an appropriate pricing option can be generated for the imagery collection request and the imagery collection request can be prioritized in relation to other outstanding imagery collection requests.

For a constellation of imaging satellites, whether an imagery collection request can be accepted may be dependent on the load of the constellation of imaging satellites. The load may reflect the capacity for acquiring images (e.g., the amount of imaging time that is available), the capacity for delivering the imaging data from the satellite to a ground station, and the demand for imagery. For example, if the imaging satellites are occupied with taking previously scheduled images past a desired completion date for a new imagery collection request, the new imagery collection request may be rejected. The pricing of an imagery collection request may be based, among other factors, on the supply of images in the desired geographic region of the imagery collection request and the demand for images in the same geographic region.

Terminology

Unless explicitly indicated otherwise, terms as used herein will be understood to imply their customary and ordinary meaning. For example, pair-wise constraint is a broad term and is to be given its ordinary and customary meaning to a person of ordinary skill in the art (e.g., it is not to be limited to a special or customized meaning), and includes, without limitation, constraints that prohibit an event based solely on properties of an immediately preceding event. For example, two image collection events are pair-wise constrained if there is insufficient time between the first image collection event and the second image collection event to change a pointing direction of an imaging satellite to perform the second image collection event.

Cumulative constraint is a broad term and is to be given its ordinary and customary meaning to a person of ordinary skill in the art (e.g., it is not to be limited to a special or customized meaning), and includes, without limitation, constraints that prohibit an event based on properties of preceding events. For example, an image collection event can be constrained if by performing the event the temperature of a camera acquiring the image would exceed acceptable temperature limits due at least in part to prior events.

In some implementations, a constellation of satellites can include any type of satellite including but not limited to satellites, mini-satellites, micro-satellites, nano-satellites, and so forth. Micro-satellite is a broad term and is to be given its ordinary and customary meaning to a person of ordinary skill in the art (e.g., it is not to be limited to a special or customized meaning), and includes, without limitation, satellites with a mass less than or equal to about 500 kg and/or physical dimensions less than or equal to about 125 cm×125 cm×175 cm, or satellites that launch as a secondary payload on a launch vehicle. According to some conventions, satellites having a mass less than or equal to about 500 kg are classified as small satellites with further divisions being made based on their mass. For example, in one classification system, small satellites are deemed mini-satellites when they have a mass between about 100 kg and 500 kg, micro-satellites when they have a mass between about 10 kg and 100 kg, nano-satellites when they have a mass between about 1 kg and 10 kg, pico-satellites when they have a mass between about 0.1 kg and 1 kg, and femto-satellites when they have a mass less than or equal to about 100 g. However, any reference to micro-satellite, mini-satellite, or small satellite in this disclosure should be understood to mean the general class of satellites having a mass less than or equal to about 500 kg and/or physical dimensions less than or equal to about 125 cm×125 cm×175 cm; and not to the more specific classification of satellites identified herein or other similar classification schemes.

Overhead image is a broad term and is to be given its ordinary and customary meaning to a person of ordinary skill the in the art (e.g., it is not to be limited to a special or customized meaning) and includes, without limitation, satellite images captured by satellites in earth-orbit, or other overhead images captured by aircraft (e.g., airplanes, helicopters, drones, unmanned aerial vehicles (UAV), balloons, etc.) surveying a geographic region, and the like. In some cases, the overhead image may be of an astronomical object rather than a terrestrial object. Images (or imagery) can include both still images and/or video.

Example Network of Imaging Micro-Satellites

FIG. 1 illustrates a representation of an example constellation 10 of imaging micro-satellites 12 in a low-earth orbit, a control system 14, a ground communication system 16, and an example of a desired image area 18. Embodiments of the systems and methods described herein can be used to schedule events in the constellation 10 including, for example, determining which micro-satellite 12 is to acquire an image of the desired image area 18, when the image is to be acquired, when the image is to be communicated to the ground communication system 16, and/or other scheduling events. The image can include a plurality of images, video, etc. In some implementations, the imaging micro-satellites 12 can include an image acquisition system configured to acquire multi-spectral and/or pan-spectral images or videos of the desired image area 18. The imaging micro-satellites 12 can be owned and/or operated by a single entity or multiple entities. In various implementations, the constellation 10 may include 2, 4, 8, 10, 12, 16, 24, 30, or some other number of satellites. Although FIG. 1 shows an example constellation of micro-satellites 12, in other implementations the constellation 10 can include additional or different types of satellites including telecommunications satellites, mini-satellites, and so forth.

The control system 14 can be configured to schedule events in the constellation. For example, the control system 14 can include embodiments of the control system 202 described with reference to FIG. 2. The control system 14, 202 can interface with a pricing and delivery system 204 described with reference to FIGS. 2-11. Scheduled events can include one or more tasks to be performed, data to be collected, information to be received or transmitted, duration, desired start time, desired end time, desired results, or any combination of these. For example, for an imaging satellite, events can be any task to be performed by the imaging satellite and can generally include, without limitation, imagery collection (e.g., of the desired image area 18), imagery downlink (e.g., to the satellite ground communication station 16), and onboard maintenance.

The selection, pricing, and/or prioritization of imagery collected by satellites can be computationally difficult, particularly as the number of requests for imagery increases. Combinatorial optimization problems are notoriously difficult to solve and may be NP-complete meaning the computational time to solve the problem increases very rapidly as the size of the problem (e.g., the number of imagery requests, the number of satellites in the constellation, the number of constraints, etc.) grows. Hardware computational resources may be necessary to find an optimal, or near-optimal, solution to the problem in many cases.

Embodiments of the systems, methods, and algorithms described herein advantageously can be used to determine whether imagery can be collected, the pricing of collected imagery, and/or how to prioritize multiple requests for imagery. As an example, the availability of the constellation 10 of satellites and pricing information can be provided to users or customers. The control system 14, 202 can use the prioritization information to schedule events in a way that improves or maximizes the productivity of the constellation 10 of satellites. The pricing and delivery system 204 can utilize any method described herein for selecting, pricing, and prioritizing images obtained by a constellation of imaging satellites, such as the example method 1100 described herein with reference to FIG. 11.

Example Selection, Pricing, and Prioritization Systems and Methodologies

Figure 2:
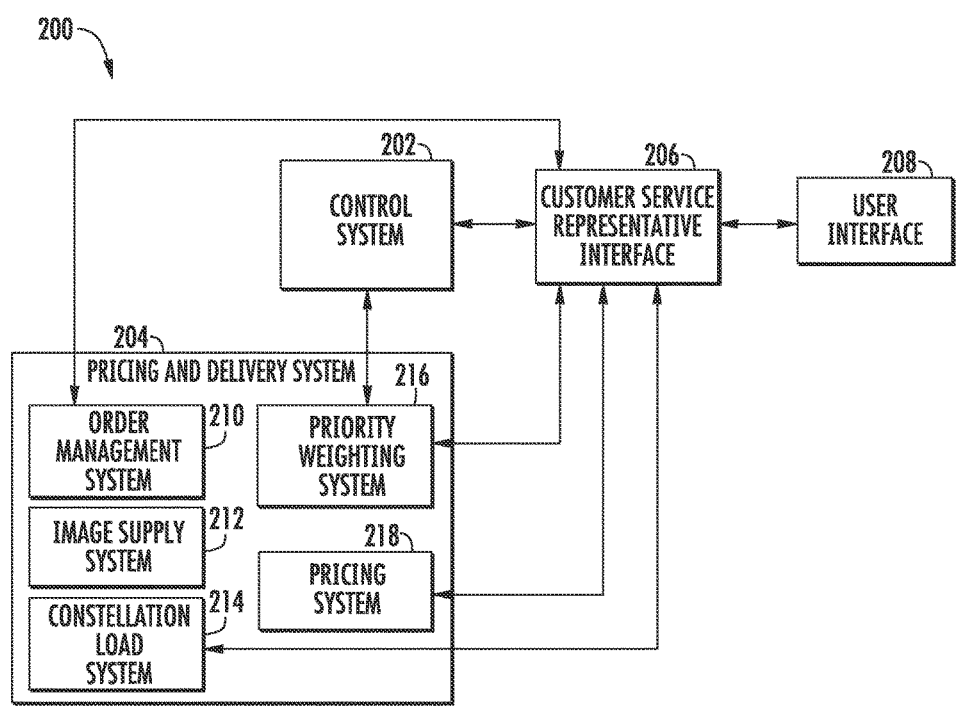
FIG. 2 illustrates a block diagram of an example embodiment of a scheduling system that includes a pricing and delivery system configured to select, price, and prioritize the collection of imagery.

FIG. 2 illustrates a block diagram of an example embodiment of a scheduling system 200 that includes a pricing and delivery system 204 configured to select, price, and prioritize the collection of imagery. In an embodiment, the scheduling system 200 further includes the control system 202, a customer service representative (CSR) interface 206, and a user interface 208. While a single customer service representative interface 206 and a single user interface 208 are illustrated in FIG. 2, this is not meant to be limiting. The scheduling system 200 may include any number of customer service representative interfaces (e.g., 2, 3, 4, 5, 6, 7, or more) and any number of user interfaces (e.g., 2, 3, 4, 5, 6, 7, or more). The customer service representative interfaces and/or the user interfaces can be implemented by hardware computing devices.

In an embodiment, the pricing and delivery system 204 includes an order management system 210, an image supply system 212, a constellation load system 214, a priority weighting system 216, and a pricing system 218. Each of the systems 210, 212, 214, 216, and 218 may be implemented by one or more computing devices, such as one or more hardware processors that execute one or more instructions. One or more of the systems 210, 212, 214, 216, and 218 may include an application programming interface (API) that can be accessed by a CSR using the CSR interface 206. The systems 210, 212, 214, 216, and 218 are described in greater detail below with respect to FIGS. 2-10.

The CSR interface 206 can be implemented by one or more computing devices, such as one or more hardware processors that execute one or more instructions. In an embodiment, the CSR interface 206 is configured to provide a CSR with information regarding the options for the pricing of an image collection and/or a delivery date for said collection when discussing a potential imagery contract with a user or customer. For example, such information may allow the CSR to make the following example types of communications with the customer: (1) "We can guarantee (with 95% certainty) that your collection can be satisfied in 4 weeks for X dollars"; (2) "If you're willing to pay more, we can guarantee (with 95% certainty) that your collection can be satisfied in 2 weeks. That will cost Y dollars extra"; (3) "Sorry, but at this time of year, we cannot guarantee (with 95% certainty) the satisfaction of your request for any timespan less than 2 weeks"; and (4) "Once you've committed, no other requests will enter our system that would threaten to delay the delivery of your imagery past the latest delivery date specified." The foregoing are merely examples of the types of scheduling and/or prioritized communications that are possible. The CSR interface 206 may provide the CSR with such information via a graphical user interface (GUI).

A CSR can use the CSR interface 206 to communicate with a customer using the user interface 208. In an embodiment, the CSR interface 206 communicates with the user interface 208 via a network (e.g., a wired or wireless network, such as the Internet). The user interface 208 can be implemented by one or more computing devices, such as one or more hardware processors that execute one or more instructions. The user interface 208 may be configured to provide the customer with information regarding the options for the pricing of an image collection and/or a delivery date for said collection when discussing a potential imagery contract with a CSR. The user interface 208 may provide the customer with such information via a GUI and may be configured to accept user input (and communicate the user input to the CSR)

The order management system 210 of the pricing and delivery system 204 may be configured to produce or receive a request for an imagery collection from the CSR interface 206. The CSR interface 206 may have received such request from the user interface 208. One of more of the systems 212, 214, 216, and/or 218 may be configured to process the imagery collection request in order to provide the CSR interface 206, and ultimately the user interface 208, with scheduling and/or pricing options. In an embodiment, the pricing and delivery system 204 is configured to increase and/or maximize revenue that can be generated by the requested imagery collection using one or more processes described herein. For example, the pricing and delivery system 204 may increase and/or maximize revenue based on a calculated supply, a calculated priority weight, a constellation 10 load, and/or a calculated demand.

Supply

Supply may represent a total amount of imagery that can be expected to be captured by the constellation 10 of satellites. In an embodiment, the image supply system 212 is configured to determine a quantitative measure of the supply over a specified time period, such as a year (e.g., supply would then represent a total amount of imagery that can be expected to be captured per year). The calculated supply may include the spatial and/or temporal distribution of the images that can be captured.

In an embodiment, a quantitative measure of supply is the expected period of time it takes to satisfy image collection requests, e.g., $E[T_{success}]$, where $E[\ ]$ is a statistical expectation operator or function, and $T_{success}$ is the time taken to satisfy an image collection request. The difficulty with which a collection request can be satisfied may be directly proportional to the expected period of time it takes to satisfy an image collection request after a previous image collection request has been satisfied. In some implementations, the image supply system 212 may be configured to determine the expected period of time it takes to satisfy an image collection request after a previous image collection request has been satisfied as follows:

$$E[T_{success}] = T_{revisit} * E[n_{success}] * \frac{1}{\eta_{system}} \quad (1)$$

where $T_{revisit}$ represents a revisit period of time (e.g., a period of time it takes before a satellite can reach a location in which the satellite can capture an image of a desired location again), and $E[n_{success}]$ represents the expected number of satellite passes over a desired location before a successful image can be taken, $n_{success}$. As discussed herein, historical weather data (e.g., historical cloud cover) can influence the expected number of passes. The parameter $\eta_{system}$ represents system performance (e.g., a measure of the efficiency at which one or more satellites can operate).

In an embodiment, for a given desired satellite and collection area, such as the desired image area 18, $T_{revisit}$ is a function of a satellite's orbital period, $n_{sat}$, the collection area's latitude, $lat_{coll}$, the season of the year, and any geometric constraints specified for the image collection (e.g., images from certain angles are desired). For example, the image supply system 212 may be configured to determine $T_{revisit}$ as a function of these parameters (where the subscript "coll" references the collection area):

$$T_{revisit}(n_{sat}, lat_{coll}, season, constraints_{coll}) \quad (2)$$

In some embodiments, image collections that occur closer to the poles of a planet (e.g., Earth) with less constraining geometric constraints are in greater supply (e.g., have a lower $T_{revisit}$) than image collections that occur closer to the equator of the planet and/or with more constraining geometric constraints. Furthermore, image collections may be in greater supply in the hemisphere that is in summer. Equation (2) may quantify these effects.

Figure 3:
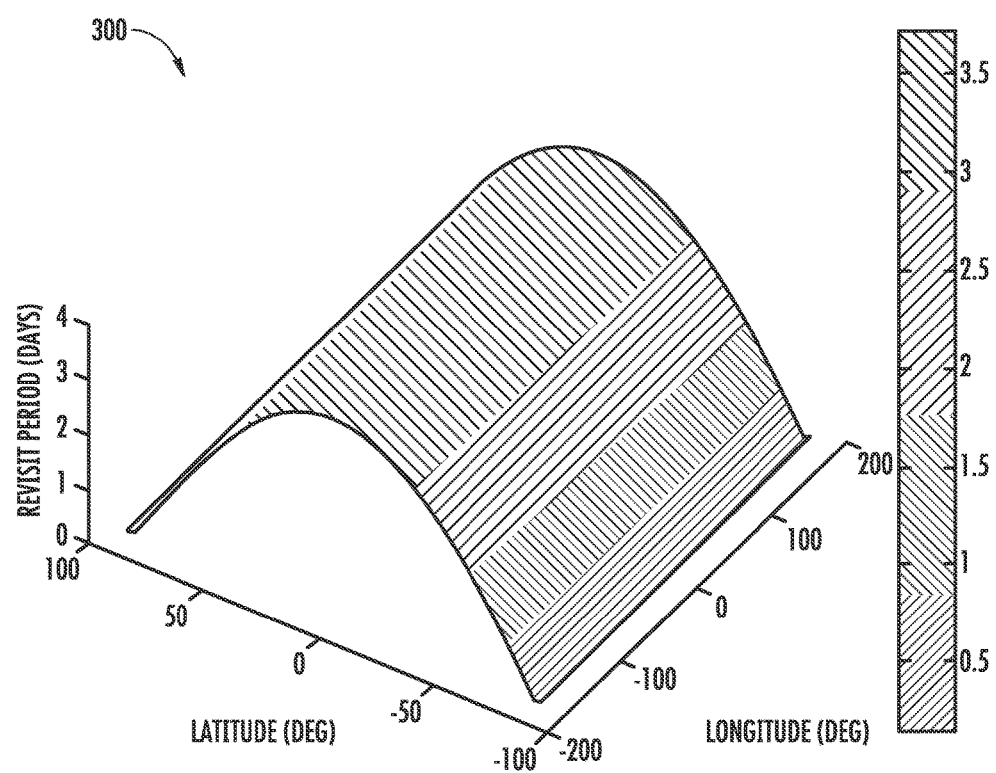
FIG. 3 illustrates an example embodiment of a geographical distribution of a revisit period of time.

FIG. 3 illustrates an example embodiment of a geographical distribution 300 of a revisit period of time, $T_{revisit}$. As illustrated in FIG. 3, the geographical distribution 300 is for a revisit period of time (in days, on the vertical axis) as a function of latitude and longitude (in degrees) of the desired collection area. This example graph has been generated for the month of March for a point collection with a 30 degree maximum off-nadir angle. As can be seen in the example in FIG. 3, the revisit period is shorter for latitudes near the poles (+90 degrees) than near the equator (0 degrees). The image supply system 212 may be configured to generate the geographic distribution 300. While FIG. 3 illustrates a point collection with a 30 degree maximum off-nadir angle, this is not meant to be limiting. The geographical distribution 300 may include a point collection with any degree angle (e.g., 0, 15, 20, 25, 35, 40, etc.) and with any type of angle.

The expected number of passes before successfully capturing an image, $E[n_{success}]$, can depends, for example, on whether the satellite can "see" the desired collection area through cloud cover, fog, haze, pollution, smoke, dust, sand, etc. that may be over or obscuring the desired collection area. In an embodiment, historical weather data may assist in the quantification of supply. For example, a satellite may travel over a desired collection area while cloud cover obscures it. Historical weather data, and specifically historical cloud cover data, can provide a likelihood function of whether or not a particular location on a planet (e.g., Earth) is obscured. Historical weather data may be function of a desired collection area's latitude and longitude and/or a time of year. For instance, the image supply system 212 may be configured to determine historical cloud cover data (e.g., the probability the desired collection area is obscured, e.g., by clouds) as a function of the following parameters:

$$p_{clouds}(lat_{coll}, long_{coll}, time) \quad (3)$$

Figure 4:
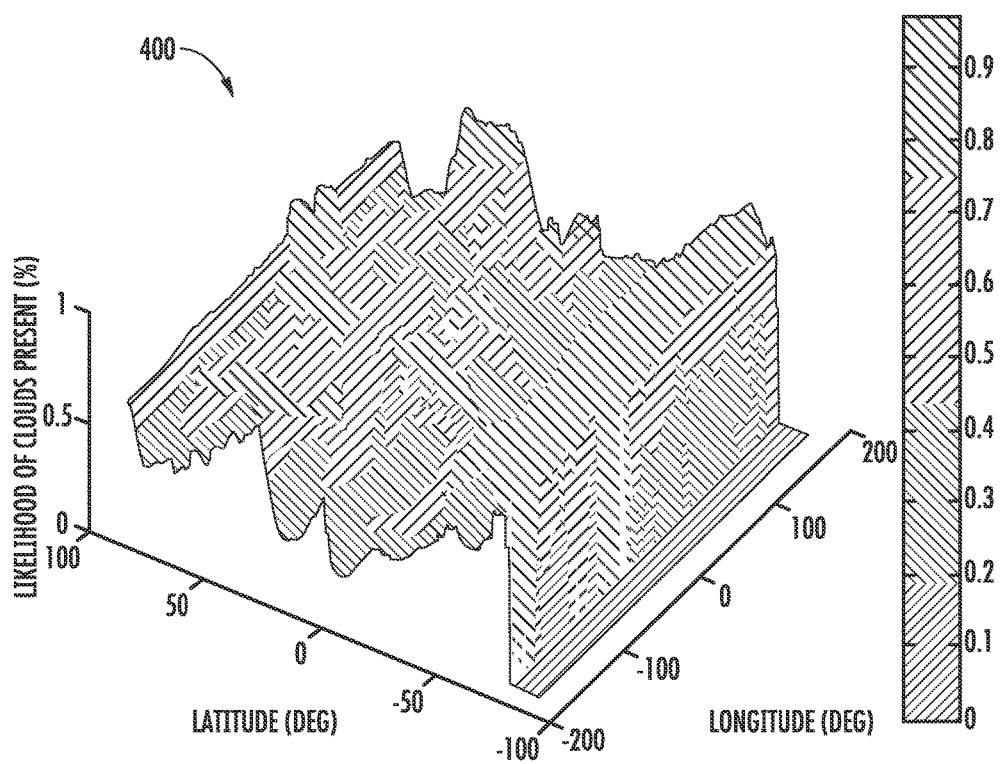
FIG. 4 illustrates an example embodiment of a geographical distribution of cloud cover during a period of time.

FIG. 4 illustrates an example embodiment of a geographical distribution 400 of cloud cover during a period of time as a function of latitude and longitude of the desired collection area. As illustrated in FIG. 4, the geographical distribution 400 represents the likelihood of clouds for a given location on a planet (e.g., Earth) during the month of March. In an embodiment, the image supply system 212 is configured to generate the geographic distribution 400.

Given a likelihood function (such as the example shown in FIG. 4), or the function $p_{clouds}$ of Equation (3), the image supply system 212 can be configured to determine the expected number of passes before an image is successfully captured by a satellite (e.g., $E[n_{success}]$) as follows, in some embodiments:

$$E[n_{success}] = \sum_{i=1}^{\infty} (1 - p_{clouds}) p_{clouds}^{i-1} i \quad (4)$$

For example, if a location on Earth has a value $E[n_{success}]$ of 10, then 50% of the time an image of the desired imagery location successfully can be captured by the satellite with fewer than 10 passes, and 50% of the time an image of the desired imagery location successfully can be captured by the satellite with more than 10 passes. In some embodiments, Equation (4) can be summed to yield $E[n_{success}]=1/(1-p_{clouds})$, which is equal to 1 divided by the probability that it is clear (e.g., not cloudy) at the desired collection area.

Figure 5:
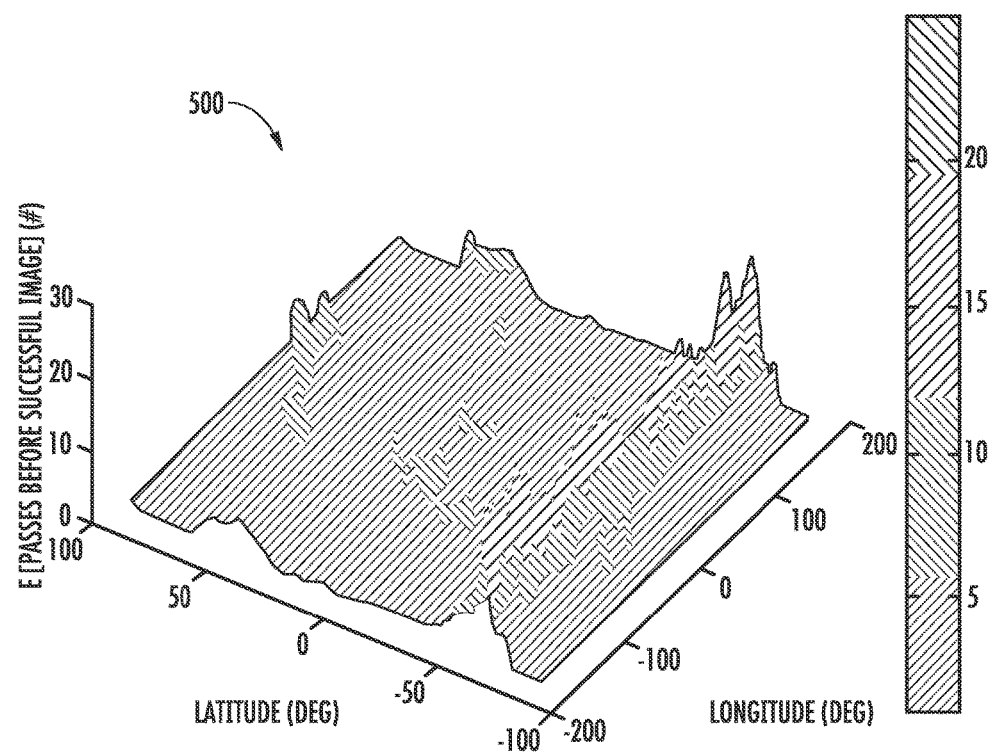
FIG. 5 illustrates an example embodiment of a geographical distribution of an expected number of passes before an image is successfully captured by a satellite.

FIG. 5 illustrates an example embodiment of a geographical distribution 500 of an expected time to successfully capture an image, $E[T_{success}]$ (measured in number of passes before an image is successfully captured by a satellite) as a function of latitude and longitude of the desired collection area. The example distribution 500 in FIG. 5 is based on Equation (1) and allows for delays due to cloud cover over the desired imagery location and downtime of the satellite. In an embodiment, the geographical distribution 500 is dependent on a given period of time. For example, as illustrated in FIG. 5, the geographical distribution 500 is of an expected number of passes during the month of March. In an embodiment, the image supply system 212 is configured to generate the geographic distribution 500.

Figure 6:
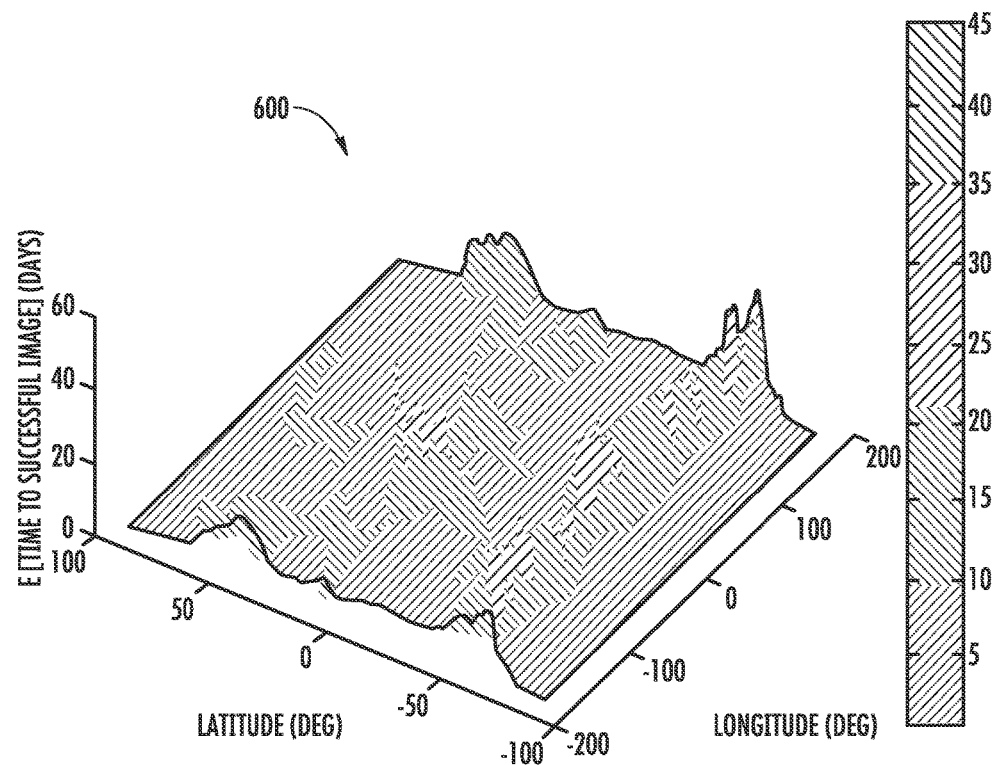
FIG. 6 illustrates an example embodiment of a geographical distribution of an expected period of time it takes to satisfy an image collection request after a previous image collection request has been satisfied for a point collection with a 30 degree maximum off-nadir angle.

FIG. 6 illustrates an example embodiment of a geographical distribution 600 of an expected period of time it takes to satisfy an image collection request after a previous image collection request has been satisfied. The distribution 600 is for a point collection with a 30 degree maximum off-nadir angle. As illustrated in FIG. 6, the geographical distribution 600 is of an expected period of time (e.g., days) during the month of March. While FIG. 6 illustrates a point collection with a 30 degree maximum off-nadir angle, this is not meant to be limiting. The geographical distribution 600 may include a point collection with any degree angle (e.g., 0, 15, 20, 25, 35, 40, etc.) and with any type of angle. In an embodiment, the geographical distribution 600 allows for delays due to cloud cover over the desired imagery area and/or downtime of the satellite. The image supply system 212 may be configured to generate the geographic distribution 600.

In an embodiment, the image supply system 212 is configured to determine the quantitative measure of supply before the order management system 210 receives the imagery collection request. The image supply system 212 may update the quantitative measure of supply when or after new data (e.g., revised historical weather data) is received. In another embodiment, the image supply system 212 is configured to determine the quantitative measure of supply when the order management system 210 receives the imagery collection request.

Priority Weights

A priority weight can be used, at least partly, by the pricing and delivery system 204 to prioritize imagery to be scheduled by the control system 14, 202. Imagery requests with higher priority weights will tend to be handled earlier than imagery requests with lower priority weights and vice-versa. The priority weighting system 216 may be configured to determine one or more priority weights. In an embodiment, a priority weight is dependent on a customer satisfaction window. A customer satisfaction window may be a time period during which the customer desires an imagery collection at a desired imagery area to be completed or satisfied (e.g., $T_{satisfaction}$). The user interface 208, via the CSR interface 206, may be configured to provide the customer satisfaction window to the priority weighting system 216. The customer satisfaction window time period can be represented as follows:

$$T_{satisfaction} = \alpha \times E[T_{success}] \quad (6)$$

where $\alpha$ is a proportionality factor. The factor $\alpha$ may be greater than or equal to 1, since the time to satisfy the customer's request generally will be at least as long as the expected time to successfully acquire the requested image. A larger value of $\alpha$ may correspond with an imagery collection request that has a more relaxed satisfaction horizon. The customer is most demanding when $\alpha$ is 1 (e.g., the customer would like the imagery collection to be completed by the fastest statistically expected date). As an example, a particular desired imagery location may have an $E[T_{success}]$ of 10 days (e.g., the fastest a satellite can be statistically expected to capture images of the desired imagery location is 10 days). For example, with an $\alpha$ of 3, the desired imagery location would be captured within about a month (30 days) to satisfy the imagery collection request (and could be captured about every month if the desired imagery location is rescheduled with an $\alpha$ of 3 every month). With an $\alpha$ of 36, the desired imagery location could be captured any time during the year (360 days) to satisfy the imagery collection request.

In an embodiment, the priority weighting system 216 may be configured to determine the priority weight as follows:

$$w(t_0) = \frac{1}{\alpha} = \frac{E[T_{success}]}{T_{satisfaction}} \quad (7)$$

As can be seen from Equation (7), as the customer satisfaction window grows closer (e.g., the deadline $T_{satisfaction}$ to complete the imagery collection request nears), the priority weight may increase, thereby representing the increasing urgency to capture an image(s) of the desired imagery location and satisfy the imagery collection request before the customer satisfaction time expires. In a further embodiment, the priority weight can be represented as a function of time elapsed as follows:

$$w(t_{elapsed}) = \frac{E[T_{success}]}{T_{satisfaction} - t_{elapsed}} \quad (8)$$

In an embodiment, priority weights $w(t_0)$ and/or $w(t_{elapsed})$ represent a higher priority when greater than 1. As follows from Equations (7) and (8), the priority weight can be determined with just one piece of information obtained from the customer (e.g., the customer satisfaction window by asking the question "when would you like your pictures by?"). Furthermore, the priority weight takes into account local conditions at the desired imagery location locathat could affect image collection (e.g., cloud cover, latitude, resource sharing with other satellites, etc.) via $E[T_{success}]$. In addition, the priority weight represented as a function of time elapsed may be normalized. For example, with all else equal, a first imagery collection request with a $T_{satisfaction}$ of 60 days and 30 days already passed may have the same priority weight as a second imagery collection request with a $T_{satisfaction}$ of 30 days and 0 days have already passed. The system 204 (or a human collection planner) can determine which imagery collection requests are most urgent by identifying requests for which the priority weights are largest, for example, $w(t_{elapsed})$ greater than 1.

Figure 7:
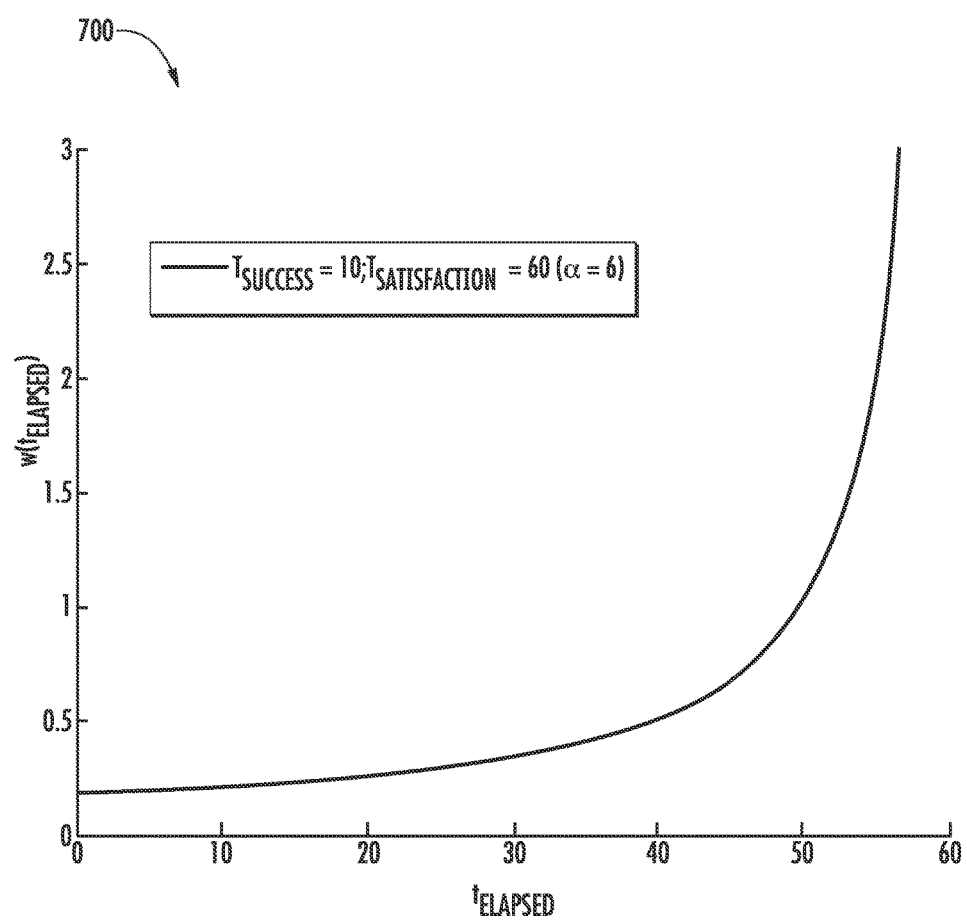
FIG. 7 illustrates a graph that depicts an example of the value of a priority weight as a customer satisfaction window nears completion.

FIG. 7 illustrates a graph 700 that depicts an example of the value of a priority weight as a customer satisfaction window nears completion (e.g., as the deadline for completing the imagery collection nears). The graph 700 depicts the value of a priority weight for a desired imagery location where $T_{success}$ is 10 days and where the customer has specified a $T_{satisfaction}$ of 60 days (e.g., a equals 6). As illustrated in FIG. 7, the priority weight increases rapidly as the time elapses and the customer satisfaction window nears completion. The priority weighting system 216 may be configured to generate the geographic distribution 700.

In an embodiment, the priority weighting system 216 is configured to provide priority weights determined using Equation (7) and/or (8) to the control system 14, 202. The control system 14, 202 may be configured to determine the scheduling of the constellation 10 of satellites based on the received priority weights.

Figure 8:
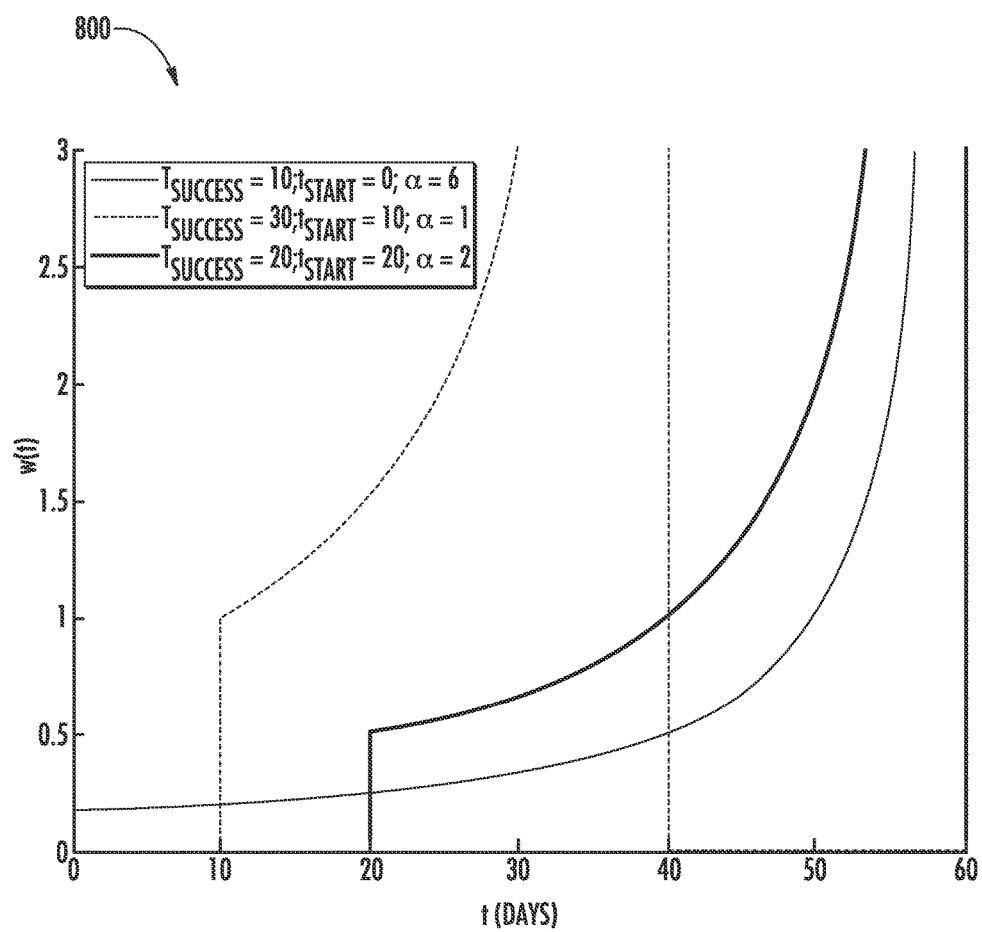
FIG. 8 illustrates a graph that includes examples of various priority weights in the vicinity of a geographic location.

FIG. 8 illustrates a graph 800 that includes examples of various priority weights in the vicinity of a geographic location. As illustrated in FIG. 8, priority weights are depicted for various $T_{success}$, $t_{start}$ (described below), and a. For example, three imagery collection requests are handled during a 60 day span. The priority weights increase as the satisfaction time approaches. In this example, the priority weight is zero before the start time, $t_{start}$, which means the image will not be scheduled before the start time. The priority weighting system 216 may be configured to generate the graph 800.

Constellation Load

The constellation load system 214 can be configured to determine a constellation load or a load on the constellation 10 of satellites. The constellation load or a load on the constellation 10 of satellites may be a function that determines whether a new imagery collection request is accepted or rejected based on an existing imagery collection requests. The constellation load may be a function of geography and time. The constellation load can be a function that guides the acceptance and/or rejection of new collection requests, base at least partly on the existing set of requests already accepted by the system.

A load function can represent an amount of outstanding imaging collections that have already been accepted in the vicinity of a certain location x on Earth at a certain time t. The constellation load system 214 may be configured to determine the load function as follows:

$$I(x, t) = \sum_{j=0}^{N} \frac{1}{\alpha_j} \quad (9)$$

where index j represents an outstanding collection, $\alpha_j$ represents the j-th proportionality factor, and each of the N outstanding collections may take place near location x with a start time, $t_{start}$, before time t and a finish time, $t_{start} + T_{satisfaction}$, after time t. In an embodiment, the constellation load system 214 is configured to determine a cumulative load function, L(x,t), which is a normalized integral of I(x, t), as follows:

$$L(x,t) = \frac{1}{t_2 - t_1} \int_{t_1}^{t_2} I(x,t)dt \qquad (10)$$

where the constellation load system 214 may be configured to determine $t_1$ and $t_2$ as follows:

$$t_1 = \min(t_{start,j}) \qquad (11)$$

$$t_2 = \max(t_{start,j} + T_{satisfaction,j}). \qquad (12)$$

In an embodiment, if a value produced by the cumulative load function is greater than 1 over a time span from $t_1$ to $t_2$, then the constellation 10 of satellites are overloaded beyond the maximum amount of imagery that can be captured during a given period of time. Thus, the pricing and delivery system 204 (and specifically the constellation load system 214 in some embodiments) may reject a new imagery collection request if the value produced by the cumulative load function is greater than 1. In some embodiments, the constellation load system 214 provides information regarding whether a new imagery collection request should be accepted or rejected to the CSR interface 206. The CSR interface 206 may be configured to forward such information to the user interface 208. In further or other embodiments, the constellation load system 214 provides information regarding the minimum customer satisfaction window that can be accepted to the CSR interface 206. For example, the constellation load system 214 may use Equation (10) to determine the smallest value of $T_{satisfaction}$ for an imagery collection starting at $t_{start}$ that does not result in the value produced by the cumulative load function $L(x,t_2)$ being greater than 1. The CSR interface 206 can relay such information to the user interface 208.

In some embodiments, if the constellation load system 214 determines that the imagery collection request received from the user interface 208 via the CSR interface 206 cannot be accepted, the various systems 212, 214, 216, and/or 218 are notified and do not process the imagery collection request as described herein. In other embodiments, if the constellation load system 214 determines that the imagery collection request received from the user interface 208 via the CSR interface 206 cannot be accepted, the pricing system 218 still uses the imagery collection request to update or revise a determined quantitative measure of demand, which is described in greater detail below.

Figure 9:
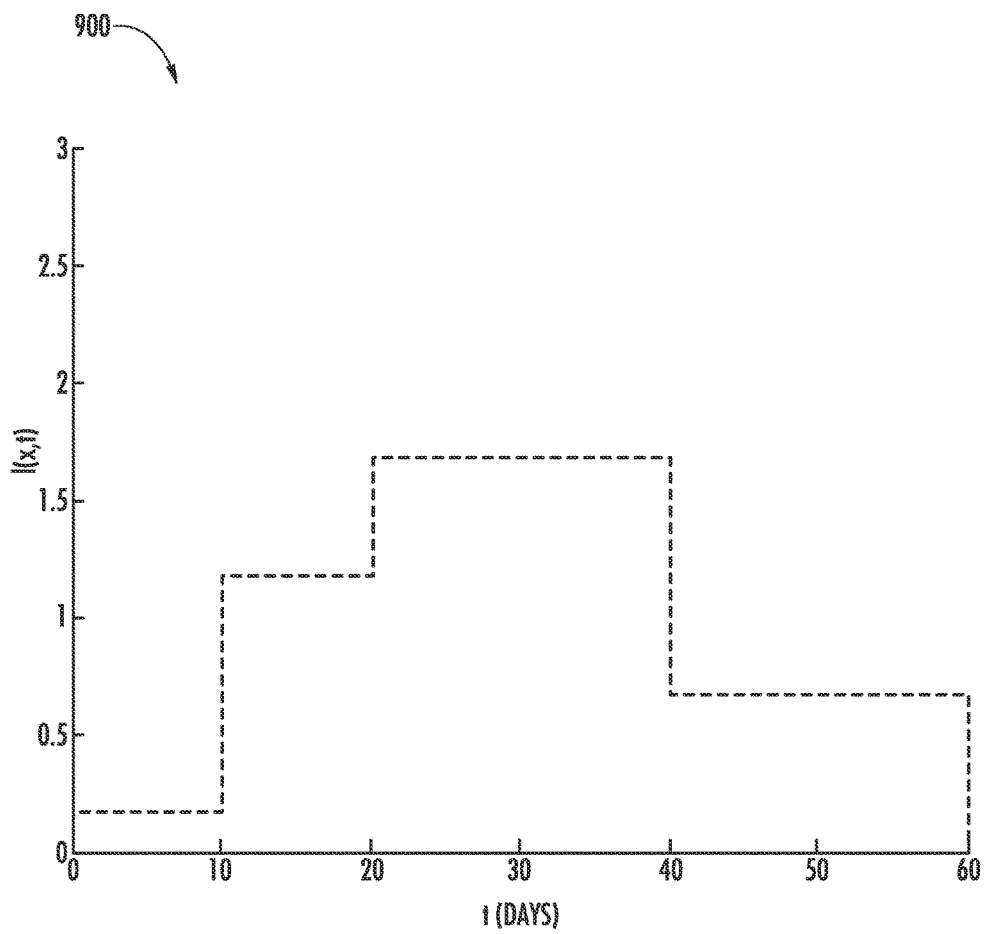
FIG. 9 illustrates a graph that includes an example of a constellation load in the vicinity of a geographic location.

FIG. 9 illustrates a graph 900 that includes a an example constellation load I(x,t) in the vicinity of a geographic location x as a function of time t. As illustrated in FIG. 9, the constellation load is depicted over a 60 day span. The constellation load is based on the example of three collection requests shown in FIG. 8. The constellation load system 214 may be configured to generate the graph 900.

Figure 10:
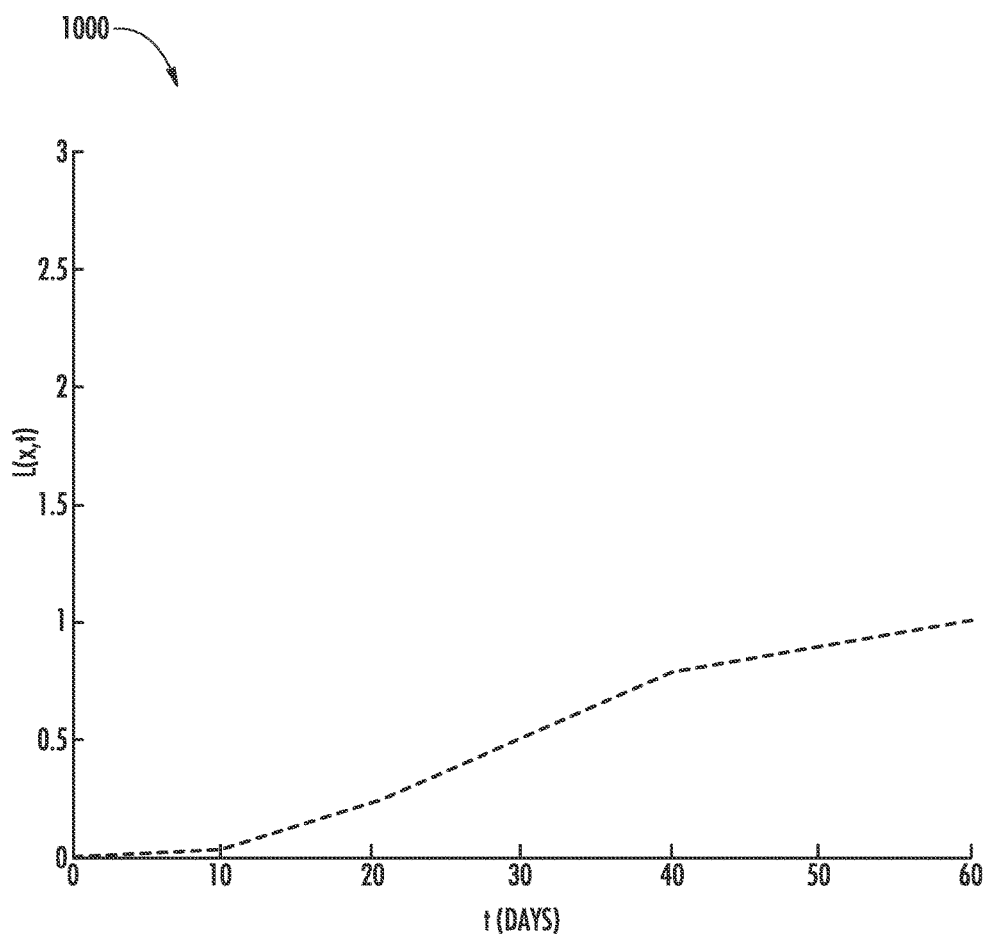
FIG. 10 illustrates a graph that includes an example of a cumulative load in the vicinity of a geographic location.

FIG. 10 illustrates a graph 1000 that includes an example of the cumulative load L(x,t) in the vicinity of the geographic location x for the example constellation load shown in FIG. 9. As illustrated in FIG. 10, the cumulative load is depicted over a 60 day span. The constellation load system 214 may be configured to generate the graph 1000.

Demand

In an embodiment, the pricing system 218 is configured to determine a price for completing an imagery collection request. The pricing may be dependent on the supply of imagery (e.g., determined by the image supply system 212) and/or the demand for imagery. Demand may represent spatial, temporal, and/or market segment distribution of imagery requested per time period (e.g., per year) for one or more providers of imagery (e.g., from the satellite constellation 10 or from some or all of the geospatial imaging community). For example, if the supply of imagery for a first geographic region (e.g., the northeastern United States) is less than the supply of imagery for a second geographic region (e.g., the Atlantic Ocean), then the pricing for the collection of imagery in the second geographic region may be higher than the pricing for the collection of imagery in the first geographic region. As another example, if the demand for imagery is higher in a first geographic region (e.g., the northeastern United States) than a second geographic region (e.g., the Atlantic ocean), then the pricing for the collection of imagery in the first geographic region may be higher than the pricing for the collection of imagery in the second geographic region. The pricing system 218 may provide the price for completing an imagery collection request to the CSR interface 206, which can then forward the pricing information to the user interface 208. The demand may be based on requests received by the scheduling system 200 or based on requests received by all scheduling systems including the scheduling system 200.

The pricing system 218 may be configured to determine a quantitative measure of demand. A quantitative measure of demand can be the likelihood $p_{demand}$ that an imagery collection request is received for a geographic location x with a satisfaction window of $T_{satisfaction}$ on a given day of the year t. In some embodiments, the pricing system 218 can be configured to determine the quantitative measure of demand as follows:

$$P_{demand}(t, x_k, T_{satisfaction,k}). \qquad (13)$$

In an embodiment, the pricing system 218 can determine an expected value of how much imagery is requested in various locations on a planet (e.g., Earth) by integrating Equation (13) over a timespan (e.g., 365 days) and over a range of customer satisfaction windows as follows:

$$E[n_{images}](x) = \int_{t=0}^{t=365} \int_{T_{satisfaction}=\infty}^{T_{satisfaction}=E[T_{success}]} p_{demand}(t, x, T_{satisfaction}) dT_{satisfaction} dt \qquad (14)$$

In a further embodiment, the pricing system 218 can determine a temporal demand profile of imagery in a geographic region X throughout a time period (e.g., a year) by integrating Equation (13) over the geographic region X and over a range of customer satisfaction windows (e.g., all customer satisfaction windows) as follows:

$$E[n_{images, x \in X}](t) = \int_{x \in X} \int_{T_{satisfaction}=\infty}^{T_{satisfaction}=E[T_{success}]} p_{demand}(t, x, T_{satisfaction}) dT_{satisfaction} dx \qquad (15)$$

Equations (14) and (15) are two examples of data that the pricing system 218 can derive from the demand likelihood $p_{demand}(t, x_k, T_{satisfaction,k})$ and are not meant to be limiting. The pricing system 218 may be configured to determine or derive other data related to the geo-spatial imaging market (e.g., comparing what is the expected customer satisfaction window being requested in a geographic region in winter as opposed to summer). In some embodiments, the pricing system 218 can determine the quantitative measure of demand using additional variables not shown in Equation (13) (e.g., by customer, etc.). Further, by determining the quantitative measure of demand, the pricing system 218 can determine how imaging demand breaks down geographically and temporarily for a particular market segment (e.g., mining, agriculture, real estate, etc.). In some embodiments, the system 204 can depict various graphical representations of the demand likelihood $p_{demand}(t_{satisfaction,k})$, integrals of the demand likelihood (e.g., Equations (14) and/or (15)), such as by using a multidimensional heat map where values are shown as colors or gray scales.

In an embodiment, the pricing system 218 is configured to determine the quantitative measure of demand empirically based on historical data obtained from previous imagery collection requests received by the scheduling system 200 (e.g., the order management system 210) or received by all scheduling systems including the scheduling system 200. The scheduling system 200 may receive imagery collection requests that then are communicated to other scheduling systems for imagery acquisition, thereby becoming a clearinghouse for imagery collection requests and receiving more accurate historical data of previous imagery collection requests.

Figure 11:
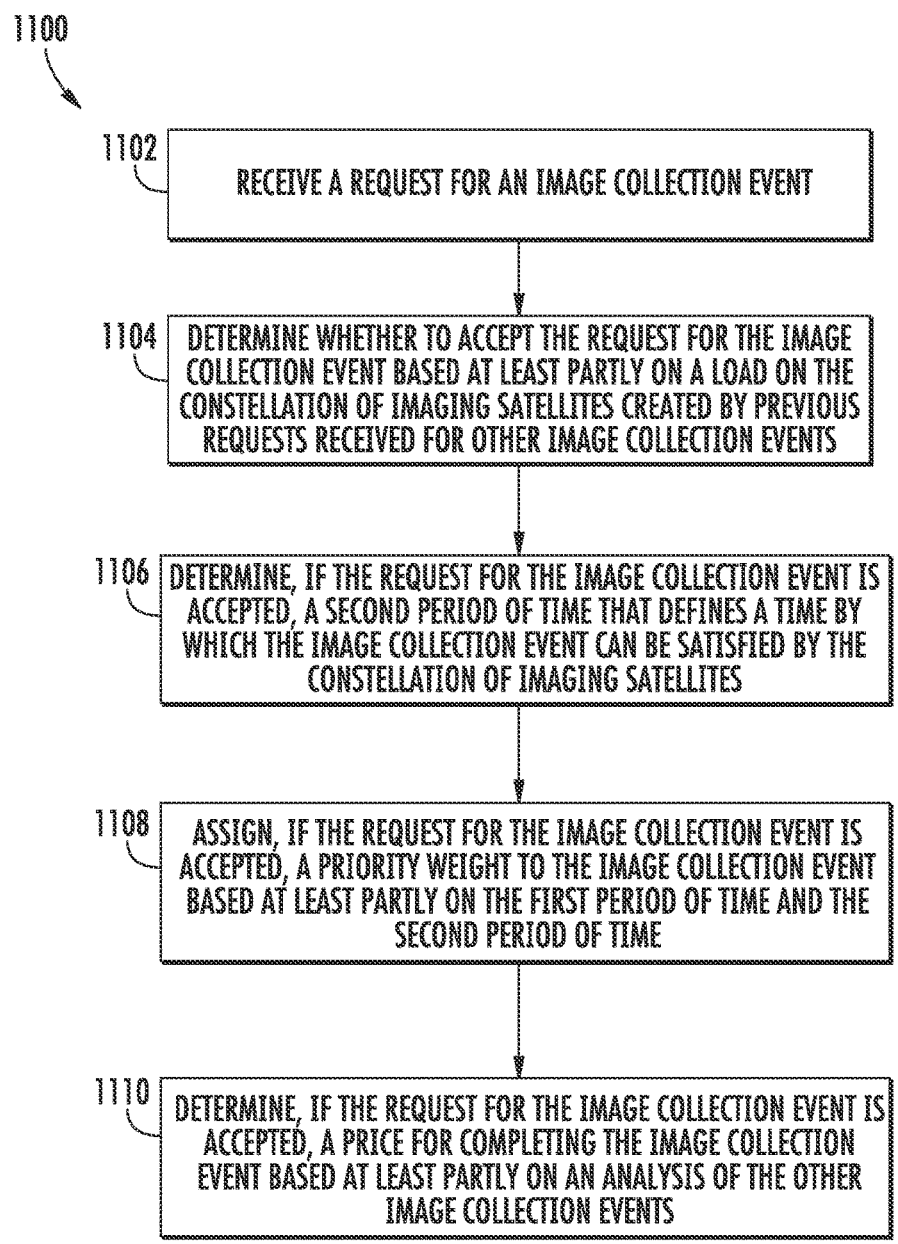
FIG. 11 illustrates a flow chart of an example method for selecting, pricing, and prioritizing images obtained by a constellation of imaging satellites.

Example Method of Selecting, Pricing, and/or Prioritizing Images Obtained by a Constellation of Imaging Satellites FIG. 11 illustrates a flow chart of an example method 1100 for selecting, pricing, and/or prioritizing images obtained by a constellation of imaging satellites. For ease of description, the blocks in the method 1100 will be described as being performed by the pricing and delivery system 204. Blocks in the method 1100, however, can be performed by various systems or modules or combination thereof. No blocks in the example method 1100 are necessary or required in every embodiment.

In block 1102, the pricing and delivery system 204 receives a request for an image collection event. For example, the image collection event can be received from a customer.

In block 1104, the pricing and delivery system 204 determines whether to accept the request for the image collection event based at least partly on a load on the constellation of imaging satellites created by previous requests received for other image collection events. In block 1106, the pricing and delivery system 204 determines, if the request for the image collection event is accepted, a second period of time that defines a time by which the image collection event can be satisfied by the constellation of imaging satellites.

In block 1108, the pricing and delivery system 204 assigns, if the request for the image collection event is accepted, a priority weight to the image collection event based at least partly on the first period of time and the second period of time. The pricing and delivery system 204 may provide the priority weight to a control system, such as the control system 14, 202, for the scheduling of imaging satellites.

In block 1110, the pricing and delivery system 204 determines, if the request for the image collection event is accepted, a price for completing the image collection event based at least partly on an analysis of the other image collection events. For example, the price may be based on the supply of images in a geographic region of the image collection event and the demand for images in the same geographic region.

Examples of Selection, Pricing, and Prioritization Systems and Methods

In embodiment 1, a system for selecting, pricing, and prioritizing images obtained by a constellation of imaging satellites is provided, the system comprising non-transitory data storage configured to store satellite properties information corresponding to characteristics of one or more imaging satellites in the constellation of imaging satellites. The system also includes a computing device in communication with the data storage, the computing device configured to execute: an order management system configured to produce or receive a request for an image collection event, where the image collection event is associated with a first time period that defines a time by which the image collection event is to be completed; a constellation load system configured to determine whether to accept the request for the image collection event based on a load on the constellation of imaging satellites created by previous requests produced or received for other image collection events; an image supply system configured to determine, if the request for the image collection event is accepted, a second period of time that defines a time by which the image collection event can be satisfied by the constellation of imaging satellites; a priority weighting system configured to assign, if the request for the image collection event is accepted, a priority weight to the image collection event based on the first period of time and the second period of time; and a pricing system configured to determine, if the request for the image collection event is accepted, a price for completing the image collection event based on an analysis of the other image collection events.

In embodiment 2, a method for selecting, pricing, and prioritizing images obtained by a constellation of imaging satellites is provided, the method comprising, under control of a computing device in communication with non-transitory data storage configured to store properties corresponding to characteristics of one or more imaging satellites in the constellation of imaging satellites, producing or receiving a request for an image collection event, where the image collection event is associated with a first time period that defines a time by which the image collection event is to be completed; determining whether to accept the request for the image collection event based on a load on the constellation of imaging satellites created by previous requests produced or received for other image collection events; determining, if the request for the image collection event is accepted, a second period of time that defines a time by which the image collection event can be satisfied by the constellation of imaging satellites; assigning, if the request for the image collection event is accepted, a priority weight to the image collection event based on the first period of time and the second period of time; and determining, if the request for the image collection event is accepted, a price for completing the image collection event based on an analysis of the other image collection events.

In embodiment 3, non-transitory computer storage comprising computer-executable instructions that, when executed by a computing system, cause the computing system to perform the method of embodiment 2.

CONCLUSION

Examples of selection, pricing, and prioritization systems and associated components and methods have been described with reference to the figures. The figures show various systems and modules and connections between them. The various modules and systems can be combined in various configurations and connections between the various modules and systems can represent physical or logical links. The representations in the figures have been presented to clearly illustrate the principles of how to produce desirable schedules in a relatively quick and efficient manner, and details regarding divisions of modules or systems have been provided for ease of description rather than attempting to delineate separate physical embodiments. Additionally, the representations in the figures have been presented to clearly illustrate the principles of selecting, pricing, and prioritizing the collection of images in a relatively quick and efficient manner, and details regarding divisions of modules or systems have been provided for ease of description rather than attempting to delineate separate physical embodiments. The examples and figures are intended to illustrate and not to limit the scope of the inventions described herein. For example, the principles herein may be applied to a constellation of satellites wherein satellites include communication satellites, imaging satellites, Earth observation satellites, navigational satellites, weather satellites, or other types of satellites. The satellites can be any of a variety of sizes such as large satellites, medium satellites, mini-satellites, micro-satellites, nano-satellites, pico-satellites, and the like. The principles disclosed herein may be applied to systems that do not comprise a constellation of imaging satellites such as, e.g., air traffic control systems, vehicle routing systems, and so forth.

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Each of the processes, methods, and algorithms described herein and/or depicted in the attached figures may be embodied in, and fully or partially automated by, code modules executed by one or more physical computing systems, computer processors, application-specific circuitry, and/or electronic hardware configured to execute computer instructions. For example, computing systems can include general or special purpose computers, servers, desktop computers, laptop or notebook computers or tablets, personal mobile computing devices, mobile telephones, and so forth. A code module may be compiled and linked into an executable program, installed in a dynamic link library, or may be written in an interpreted programming language.

Various embodiments have been described in terms of the functionality of such embodiments in view of the general interchangeability of hardware and software. Whether such functionality is implemented in application-specific hardware or circuitry or in software executing on one or more physical computing devices depends upon the particular application and design constraints imposed on the overall system. Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

Code modules may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes and process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer or software product or packaged into multiple computer or software products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network (e.g., a terrestrial and/or satellite network) or any other type of communication network.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

What is claimed is:

1. A method for selecting, pricing, and prioritizing images comprising:
    under control of one or more computing devices in communication with non-transitory data storage configured to store properties corresponding to characteristics of one or more imaging satellites in a constellation of imaging satellites:
    receiving a request for an image collection event associated with a first time period that defines a time by which the image collection event is to be completed;
    determining a second period of time that defines a time by which the image collection event can be satisfied by the constellation of imaging satellites;
    determining two or more prices for completing the image collection event, wherein the two or more prices increase as the likelihood increases that an image can at least be acquired at the earlier of the first time period and the second period of time, and wherein the two or more prices for the image collection event are based at least partly on:
        a supply indicative of a total amount of imagery that is expected to be captured by the constellation of imaging satellites, wherein the supply is based at least partly on a number of passes associated with the constellation of satellites,
        a load on at least the one or more imaging satellites created by previous requests produced or received for other image collection events, wherein the load is indicative of a first capacity of the constellation of satellites to acquire the image and a second capacity of the satellites to deliver data indicative of the image to a ground station, and
        a demand for the imagery from the constellation of satellites;
    receiving a pricing selection from the two or more prices;
    assigning a priority weight to the image collection event based on a customer satisfaction window, wherein the customer satisfaction window is indicative of a satellite timing constraint that is based at least in part on a time period associated with the pricing selection; and
    outputting data indicative of the priority weight assigned to the image collection event for the scheduling of imagery collection of the one or more imaging satellites, wherein the one or more imaging satellites in the constellation of satellites are configured to acquire the image in accordance with the image collection event based at least in part on the priority weight and downlink the data indicative of the image to the ground station.

2. The method of claim 1, wherein the second time period is determined based, at least in part, on historical weather data.

3. The method of claim 2, wherein the historical weather data comprises cloud cover.

4. A system for selecting, pricing, and prioritizing images comprising:
    a constellation of imaging satellites;
    non-transitory data storage configured to store satellite properties information corresponding to characteristics of one or more imaging satellites in the constellation of imaging satellites;
    one or more computing devices in communication with the data storage, the one or more computing devices configured to execute:
    an order management system configured to receive a request for an image collection event associated with a first time period that defines a time by which the image collection event is to be completed;
    an image supply system configured to determine a second period of time that defines a time by which the image collection event can be satisfied by the constellation of imaging satellites when the request for the image collection event is accepted;
    a pricing system configured to determine two or more prices for completing the image collection event, wherein the two or more prices increase as the likelihood increases that an image can be acquired at the earlier of the first time period and the second period of time, and wherein the two or more prices for the image collection event are based at least partly on:
        a supply indicative of a total amount of imagery that is expected to be captured by the constellation of imaging satellites, wherein the supply is based at least partly on a number of passes associated with the constellation of satellites, a load on at least the one or more imaging satellites created by previous requests produced or received for other image collection events, wherein the load is indicative of a first capacity of the constellation of satellites to acquire the image and a second capacity of the satellites to deliver data indicative of the image to a ground station, and a demand for the imagery from the constellation of satellites;

a selection system configured to receive a selection from the two or more prices; and a priority weighting system configured to:
assign a priority weight to the image collection event based on a customer satisfaction window, wherein the customer satisfaction window is indicative of a satellite timing constraint that is based at least in part a time period associated with the pricing selection, and output data indicative of the priority weight assigned to the image collection event for the scheduling of imagery collection of the one or more imaging satellites, wherein the one or more imaging satellites in the constellation of satellites are configured to acquire the image in accordance with the image collection event based at least in part on the priority weight and downlink the data indicative of the image to the ground station.

5. The system of claim 4, wherein the pricing system is configured to determine the two or more prices for completing the image collection event based on an analysis of the other image collection events.

6. The system of claim 4, wherein the second time period is determined based, at least in part, on historical weather data.

7. The system of claim 6, wherein the historical weather data comprises cloud cover.

8. A non-transitory computer storage configured with executable instructions for selecting, pricing, and prioritizing images, the executable instructions comprising:

an order management module configured to receive a request for an image collection event associated with a first time period that defines a time by which the image collection event is to be completed by at least one of imaging satellites of a constellation of imaging satellites;

an image supply module configured to determine, if the request for the image collection event is accepted, a second period of time that defines a time by which the image collection event can be satisfied by the constellation of imaging satellites;

a pricing module configured to determine two or more prices for completing the image collection event, wherein the two or more prices increase as the likelihood increases that an image can at least be acquired at the earlier of the first time period and the second period of time, and wherein the two or more prices for the image collection event are based at least partly on:

a supply indicative of a total amount of imagery that is expected to be captured by the constellation of imaging satellites, wherein the supply is based at least partly on a number of passes associated with the constellation of satellites, a load on at least the one or more imaging satellites created by previous requests produced or received for other image collection events, wherein the load is indicative of a first capacity of the constellation of satellites to acquire the image and a second capacity of the satellites to deliver data indicative of the image to a ground station, and a demand for the imagery from the constellation of satellites;

a selection module configured to receive a selection from the two or more prices; and a priority weighting system configured to assign a priority weight to the image collection event based on a customer satisfaction window, wherein the customer satisfaction window is indicative of a satellite timing constraint that is based at least in part a time period associated with the pricing selection and configured to output data indicative of the priority weight assigned to the image collection event for the scheduling of imagery collection of the one or more imaging satellites, wherein the one or more imaging satellites in the constellation of satellites are configured to acquire the image in accordance with the image collection event based at least in part on the priority weight and downlink the data indicative of the image to the ground station.

9. The non-transitory computer storage of claim 8, wherein the second time period is determined based, at least in part, on historical weather data.

10. The method of claim 1, further comprising accepting the request for the image collection event based at least in part on the load on the constellation of imaging satellites created by previous requests produced or received for other image collection events.

11. The method of claim 1, wherein the priority weight is increased as the customer satisfaction window becomes closer in time.

12. The system of claim 4, wherein the load is defined by a cumulative load function, and wherein the pricing system is further configured to reject the request for the image collection event if a value produced by the cumulative load function is greater than 1.

13. The system of claim 4, wherein the priority weight is increased as the customer satisfaction window becomes closer in time.

14. The system of claim 4, wherein the constellation of imaging satellites comprise a constellation of microsatellites.

15. The system of claim 7, wherein the priority weight is based on cloud cover.

16. The non-transitory computer storage of claim 8, wherein the pricing system is configured to determine the two or more prices for completing the image collection event based on an analysis of the other image collection events.

17. The non-transitory computer storage of claim 8, wherein the priority weight is increased as the customer satisfaction window becomes closer in time.

18. The non-transitory computer storage of claim 8, wherein the load is defined by a cumulative load function, and wherein the pricing system is further configured to reject the request for the image collection event if a value produced by the cumulative load function is greater than 1.

19. The non-transitory computer storage of claim 8, wherein the constellation of imaging satellites comprise a constellation of microsatellites.

* * * * *